United States Patent

[11] 3,578,746

| | | |
|---|---|---|
| [72] | Inventor | John H. Walker<br>Dayton, Ohio |
| [21] | Appl. No. | 799,047 |
| [22] | Filed | Feb. 13, 1969 |
| [45] | Patented | May 18, 1971 |
| [73] | Assignee | The Bendix Corporation |

[54] GAGING APPARATUS AND METHOD
23 Claims, 5 Drawing Figs.

[52] U.S. Cl. ................................................. 33/174
[51] Int. Cl. .................................................. G01b 13/02
[50] Field of Search ........................................ 33/172 (A), 172 (E), 174 (A), 174 (L), 174 (P), 174 (Q)

[56] References Cited
UNITED STATES PATENTS
3,319,340  5/1967  Graham........................ 33/174(P)

Primary Examiner—Leonard Forman
Assistant Examiner—Dennis A. Dearing
Attorney—Plante, Hartz, Smith & Thompson ABSTRACT: An apparatus for and method of controlling the force exerted by a gaging probe against a workpiece wherein gaging movement of such probe is provided along a rectilinear path coinciding with a longitudinal axis of the probe and the force exerted by the probe is kept substantially constant at all angles of inclination of the longitudinal axis of the probe relative to a reference plane.

PATENTED MAY 18 1971 3,578,746

INVENTOR.
JOHN H. WALKER
BY Ernest J. Nix
HIS ATTORNEY 3,578,746

1

GAGING APPARATUS AND METHOD

BACKGROUND OF THE INVENTION

The invention described herein was made in the course of, or under, a contract with the U.S. Atomic Energy Commission.

In providing dimensional measurements of a workpiece using a gauging probe which is movable toward and away from the workpiece in a rectilinear path coinciding with the longitudinal axis of the probe, the force exerted by the probe against such workpiece will vary for different angles of inclination of the longitudinal axis relative to a reference horizontal plane because the effective weight of the gauging probe is different for each different angle. In applications where great precision is required, the dimensional error introduced as a result of this varying force with which the gauging probe is urged against the workpiece is unacceptable.

SUMMARY

This invention provides an improved apparatus for and method of controlling the force exerted by a gauging probe against a workpiece during gauging movement of such probe in a rectilinear path coinciding with the longitudinal axis of the probe whereby the force exerted by such probe against the workpiece is kept substantially constant at all angles of inclination of the longitudinal axis of the probe relative to a reference plane.

Other details, uses, and advantages of this invention will become apparent as the following description of the exemplary embodiment thereof presented in the accompanying drawings proceeds.

BRIEF DESCRIPTION OF THE DRAWINGS

The accompanying drawings show a present exemplary embodiment of this invention, in which.

DESCRIPTION OF ILLUSTRATED EMBODIMENT

Figure 1:
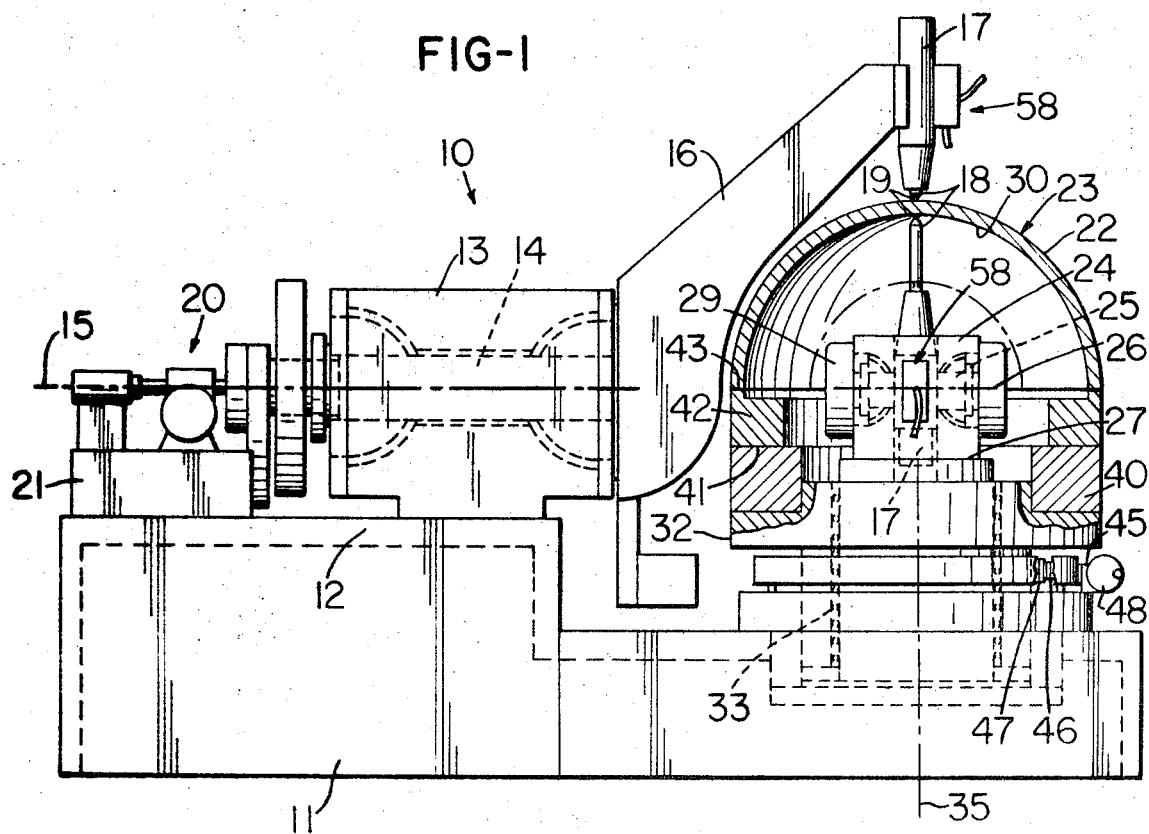
FIG. 1 is a side elevation of a measuring machine which utilizes the apparatus and method of this invention.
Figure 2:
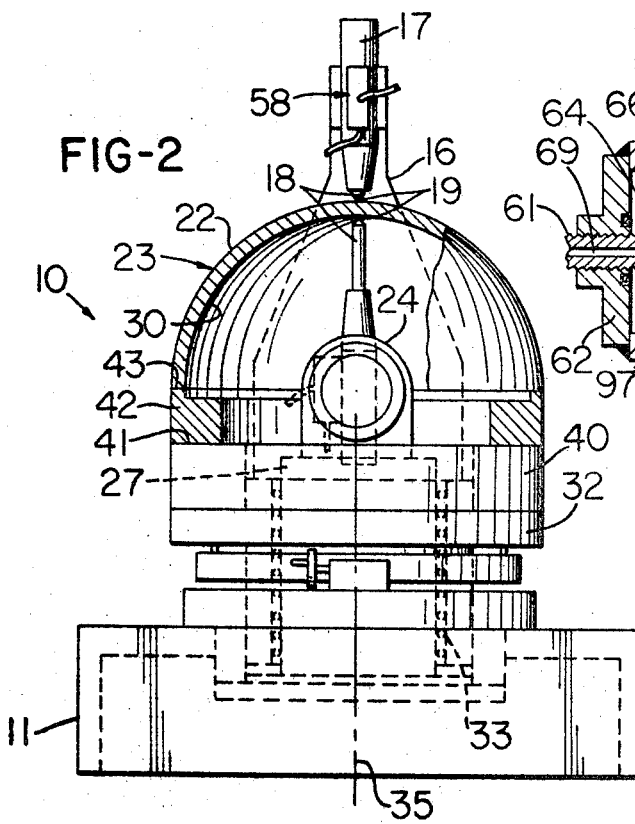
FIG. 2 is a front elevation of the measuring machine of FIG. 1.

Reference is now made to FIGS. 1 and 2 of the drawings, which illustrate an exemplary measuring machine 10 which utilizes one exemplary embodiment of the apparatus and method of this invention. The machine 10 comprises a base 11 having a portion 12 which supports an antifriction bearing assembly 13 which in turn supports a horizontal shaft 14 for substantially frictionless rotation about a horizontal axis 15. The shaft 14 has an arm 16 suitably fixed thereto and the arm 16 carries an outer gauge head 17 at the terminal outer end thereof. The outer gauge head 17 supports a gauging probe 18 for telescoping movement and the probe 18 has a workpiece-engaging tip 19.

The measuring machine 10 has a motor and gear box assembly 20 suitably supported on a supporting structure 21 fixed to the upper portion 12 of the base 11 and the assembly 20 is operatively connected to the horizontal shaft 14 to enable rotation of shaft 14, arm 16 and outer gauge head 17 through an angle of slightly greater than 180° in a vertical plane. As the outer gauge head 17 is rotated the probe 18 is held against the outside surface 22 of a hemispherical workpiece 23 by the apparatus and method of this invention with a substantially constant gauging force to provide dimensional measurements of the workpiece with great precision.

The measuring machine 10 has another antifriction bearing assembly 24 which supports a horizontal shaft 25 for substantially frictionless rotation about its horizontal axis 26 and the bearing assembly 24 is supported by an upstanding portion 27 of the base 11. The shaft 25 has another gauge head, which will be referred to as an inner gauge head, suitably fixed thereto for rotation therewith; and, because the inner gauge head is very similar to the outer gauge head 17, the inner gauge will also be designated by the reference numeral 17, with its telescoping gauging probe and probe tip also being designated by the reference numerals 18 and 19 respectively. The gauging probe 18 of the inner gauge head 17 is particularly adapted to engage the inside surface 30 of the workpiece 23 as the inner gauge head 17 is being rotated in a vertical plane by a motor and gear box assembly 29 which is supported by the upstanding portion 27 of the base 11 and operatively connected to the shaft 25 whereby the inner gauging probe 18 may also be rotated through an angle of slightly greater than 180° while urging such inner probe 18 against the inside surface 30 with a substantially constant force.

The measuring machine 10 has a support assembly 32 which is rotatably supported about upstanding portion or structure 27 of base 11 by an antifriction bearing assembly 33 whereby the support assembly 32 is rotated about the fixed vertical axis 35 of structure 27. In this example the vertical axis 35 coincides with a fixed vertical plane through which the longitudinal axes of probes 18 sweep during rotation of such probes as they engage associated surfaces of the workpiece 23.

The supporting structure 32 has a worktable 40 suitably fixed thereto and the worktable 40 has an annular supporting surface 41 which is arranged in a horizontal plane. A holding fixture 42 is provided and suitably attached to the annular planar surface 41 of the worktable 40 and the holding fixture 42 has a supporting surface 43 which supports the hemispherical workpiece 23 and holds such workpiece against movement during gauging contact thereagainst by the gauging probes 18.

The support assembly 32 and hence the worktable 40 carried thereby is rotated about the vertical axis 35 by a motor and gear box assembly 45 which has a driving spur gear 46 which engages and drives a cooperating ring gear 47 fixed concentrically around the structure 27 and the assembly 45 may be suitably connected in the machine 10 to provide fully automatic rotation of the worktable 40 through 360°. A manual override assembly 48 is provided and operatively connected to the motor and gear box assembly 45 to enable either complete manual positioning of the worktable 40 or manual repositioning or adjustment after fully automatic rotation of the worktable 40.

The assembly 45 and its cooperating ring gear 47 enable positive and precise movement and positioning of the worktable 40 and workpiece 23 about the vertical axis 35 and the engagement of gears 46 and 47 acts as a brake to hold the worktable 40 against further rotation at each position. It will also be appreciated that even though the gauging probes 18 are only movable in a fixed vertical plane the ability to rotate the workpiece to an infinite number of angular positions about the vertical axis 35 makes it possible for the inner and outer gauging probes 18 to contact the entire inside and outside surface respectively of the workpiece 23, if desired.

Figure 4:
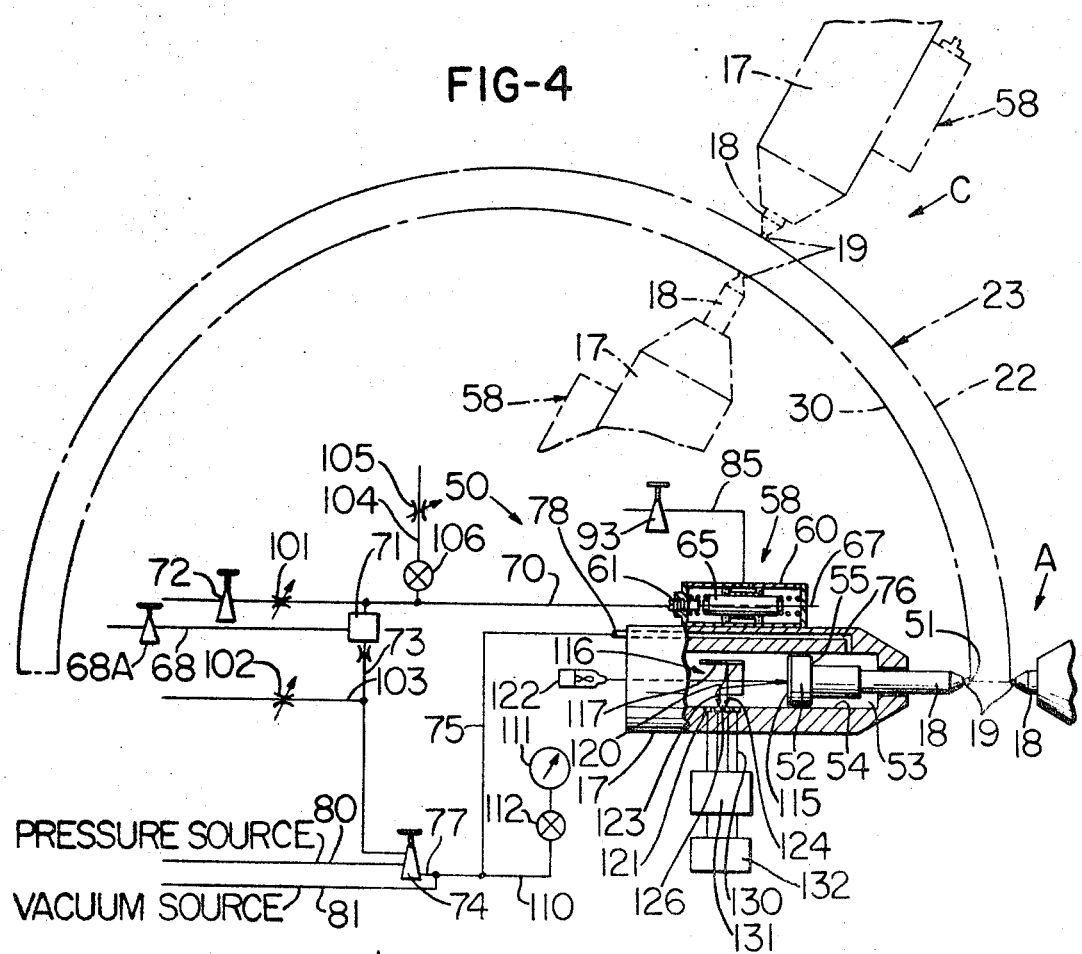
FIG. 4 is a view with certain parts presented schematically and particularly illustrating by solid lines the apparatus and method of this invention used with an inner gauge head of the machine of FIG. 1 to measure the inside of a hemispherical workpiece and also illustrating, by dotted lines, both the inner gauge head and an outer gauge head positioned at a 60° angle of inclination relative to a horizontal plane.

Each gauge head 17 has an apparatus designated generally by the reference numeral 50, see FIG. 4, which is provided to, in effect, compensate for the weight of the gauging probe 18 and in effect control the force exerted by the tip 19 of the gauging probe 18 against the workpiece 23 and keep such force substantially constant.

For simplicity and ease of presentation, the specification will now proceed with a detailed description of a control or compensating apparatus 50 associating with the inner gauge head 17 and its associated probe 18 which normally engages the inside surface 30 of the workpiece 23. However, it is to be understood that a substantially identical apparatus 50 would be provided with the outer gauge head 17 and its probe 18 which normally engages the outside surface 22 of the hemispherical workpiece 23; and, the detailed description of the apparatus 50 associating with the inner gauge head is fully applicable to the apparatus associating with the outer gauge head.

The probe 18 is supported by the gauge head 17 for telescoping movement and the probe 18 has a fluid-actuated piston 52 associated therewith which in this example of the invention defines the rear portion of such probe. The probe 18 and hence its piston portion 52 is axially slidable in a rectilinear path coinciding with a longitudinal axis 51 of the probe 18 and in a fluid chamber 53 defined in part by a tubular, i.e., right circular cylindrical, surface 54 provided in the gauge head 17. The apparatus 50 controls the pressure of an operating fluid acting against the inside surface 55 of the piston 52 as a function of the included angle between the axis 51 and a reference plane to thereby control the force exerted by the probe 18 against the workpiece 23.

A horizontal plane will be considered as the reference plane in this disclosure and the apparatus 50 is effective in controlling the pressure of the operating fluid, such as air, in the chamber 53 as a function of the sine of the angle of inclination of the axis 51 from the horizontal plane to thereby maintain the force exerted by the gauging probe 18 against the workpiece 23 substantially constant at all angles of inclination of the axis 51 of the gauging probe 18 and its associated gauge head 17 with respect to the reference horizontal plane. The apparatus 50 of this example comprises an open jet back pressure control system.

Figure 3:
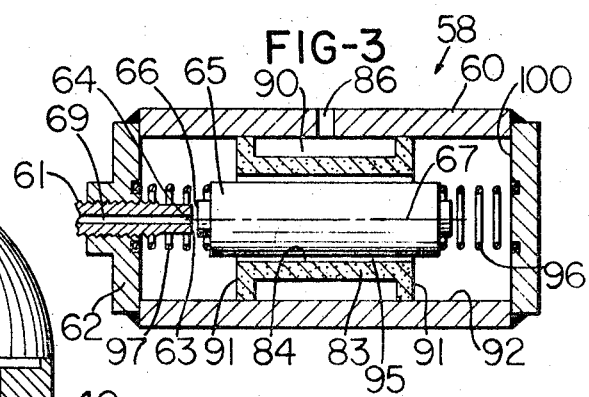
FIG. 3 illustrates an attitude-sensing device comprising the apparatus of this invention.

The apparatus 50 comprises an attitude sensor designated generally by the reference numeral 58 comprised of a support or supporting housing 60 which is suitably attached to the gauge head 17. The housing 60 has a member 61 threadedly fastened to an end portion 62 thereof and member 61 has a first planar surface 63, see FIGS. 3 and 4, which has an orifice 64 provided therein for ejecting fluid, air in the example, outwardly therefrom in a direction substantially perpendicular to the planar surface 63. The attitude sensor or member 58 has a weighted member shown as an elongated rodlike member 65 which has a second planar surface 66 which defines one terminal end of the rodlike member 65 and the planar surface 66 is arranged perpendicular to the longitudinal axis 67 of member 65. The member 65 and hence planar surface 66 is supported for limited rectilinear movement toward and away from the planar surface 63 along the axis 67 which is arranged parallel to the axis 51 of the probe 18 and planar surfaces 63 and 66 are maintained in parallel relation during such rectilinear movement.

The apparatus 50 has fluid conduit means comprised of a conduit 70 which has one end thereof in fluid flow communication with the orifice 64 by means of an internal passage 69 provided in the member 61. The conduit 70 has a pneumatic reversing relay 71 in fluid flow communication therewith and the upstream end of the conduit 70 has an adjustable pressure regulator 72 which is supplied with air from a suitable pressure source. The relay 71 is supplied with air under regulated pressure through a conduit 68 which has an adjustable pressure regulator 68A installed therein and the pressure regulator 68A is suitably connected to a source of air under pressure.

The apparatus 50 has a conduit 73 also comprising its fluid conduit means and one end of conduit 73 is in fluid flow communication with the relay 71 with a fixed restrictor being provided in the conduit 73 adjacent the relay 71 and the opposite end of conduit 73 is connected to an absolute pressure regulator 74. The operation of the absolute pressure regulator 74 is accurately controlled as a function of the control pressure in the conduit 73. The apparatus 50 also has a conduit 75 comprising its fluid conduit means and the conduit 75 has one end 77 thereof operatively connected to the absolute pressure regulator 74 and its opposite end 78 is suitably fixed to the gauge head 17 and in fluid flow communication with an internal passage 76 provided in the gauge head 17 and exiting into the chamber 53.

The absolute pressure regulator 74 may be of any suitable known construction and has a conduit 80 which supplies air thereto from a suitable pressure source. A conduit 81 is also provided and has one end connected to end 77 of conduit 75 and the opposite end of conduit 81 is operatively connected to a suitable vacuum source which attempts to maintain a constant flow of air under negative pressure in the conduit 75. The pressure regulator 74 provides air under controlled pressure to end 77 of conduit 75 so as to offset the vacuum provided by line 81 varying amounts as determined by the magnitude of the signal through line 73 which is in fluid flow communication with the attitude sensor, whereby either a controlled partial vacuum or a controlled positive pressure is provided in the chamber 53.

Figure 5:
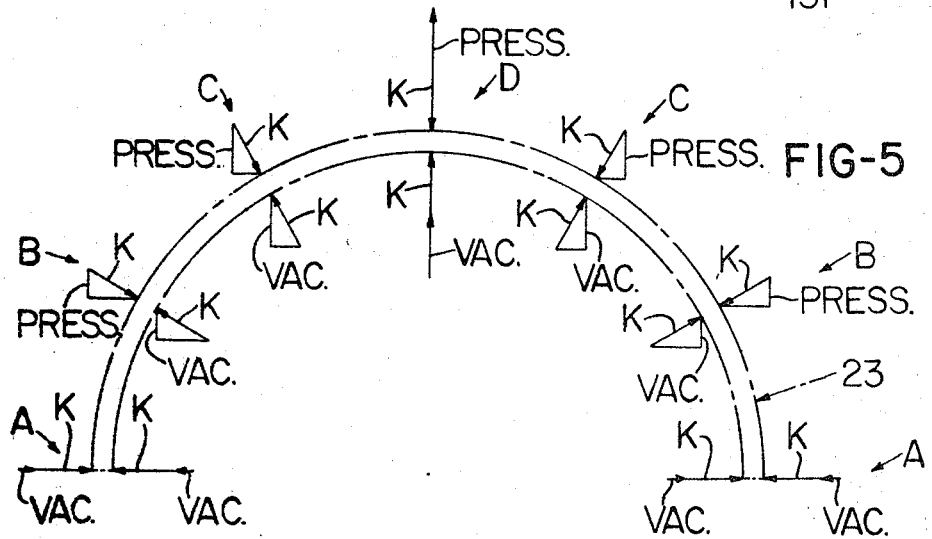
FIG. 5 is a diagram illustrating, with simple straight lines, the relative magnitude of either a pressure or vacuum which is applied against the piston of the inside and outside gauging probe at different positions on the periphery of the workpiece to assure that each probe is urged against the workpiece with a substantially constant gauging force at all positions thereof.

The components of the apparatus 50 which have been described above define the main operating components of an air back pressure system wherein as the gauge head 17 and attitude sensor 58 are moved upwardly from the horizontal position A illustrated in FIGS. 4 and 5 their parallel axes 51 and 67 are moved from positions parallel to the horizontal plane toward vertical positions causing the planar surface 66 to be urged more closely adjacent the planar surface 63 by gravity acting against the weighted member 65 to thereby provide a greater fluid pressure signal in the conduit 70 and hence a lesser fluid pressure signal in the conduit 73 to the absolute pressure regulator 74 due to the action of the reversing relay 71. The magnitude of the fluid pressure signal in the line 73 decreases in direct proportion to the sine of the angle of inclination of the axes 51 and 67 from the horizontal plane. The fluid pressure signal in the conduit 73 actuates the absolute pressure regulator, which comprises the fluid supply means for fluid chamber 53, and controls the pressure in the chamber 53 to thereby control the force with which the tip 19 of probe 18 is urged outwardly against the inside surface 30 of the workpiece 23.

The reference made throughout this specification to the control of pressure in the fluid chamber 53 is intended to cover situations wherein the pressure in the chamber 53 is a positive pressure and hence greater than atmospheric pressure and causes the piston 52 and probe 18 to be urged toward a retracted position, as well as situations wherein the pressure in the chamber 53 is a negative pressure and hence less than atmospheric and causes the piston 52 and probe 18 to be urged outwardly toward an extended position. In the illustration presented by solid lines in FIG. 4, as the inner gauge head 17, probe 18, and attitude sensor 58 are moved from the position A illustrated in a counterclockwise manner toward the top portion of the workpiece 23, it will be appreciated that a larger vacuum will be required to maintain the tip 19 of the gauging probe 18 against the inside surface 30 of the workpiece 23 with a predetermined constant force. This increased vacuum is provided by the planar surface 66 being urged by gravity more closely against the planar surface 63 to provide a signal of decreased magnitude through the line 73 to the absolute pressure regulator 74 and cause such regulator to provide air under less pressure to inlet portion 77 of conduit 75 whereby a greater vacuum is provided in the line 75.

It will also be appreciated that for the upper gauge head 17 and its gauging probe 18 the weight of the probe and piston 52 would normally tend to urge the tip 19 of the probe more firmly against the outside surface 22 of the workpiece 23. However, the setting of the absolute pressure regulator 74 associating with the upper gauge head 17 would be such that air at a pressure sufficiently greater then ambient is provided to its chamber 53 to offset the weight of the probe and assure the outer probe 18 is urged against the workpiece 23 with a predetermined constant force which may be of the same magnitude as the constant gauging force with which the inner probe 18 is urged outwardly.

As indicated above, the pressure or vacuum which is to be provided in a particular chamber 53 will vary for different angles of inclination of the associated gauge head and as will be readily understood from FIG. 5 of the drawings. However, irrespective of whether the pressure in a given chamber is a positive pressure or a negative pressure its magnitude and hence the force acting against the piston 52 of the associated probe will vary as a function of the sine of the angle of inclination of the associated probe from a horizontal plane. To enable an easier understanding of the invention, FIG. 5 illustrates vertical lines of different lengths signifying relative magnitude of pressures in an associated chamber 53 and hence forces acting against an associated probe 18 at a plurality of positions, shown as positions A through D, with position A signifying a position where the probes 18 and weighted members 65 having their axes 51 and 67 arranged horizontally, and position D signifying probes 18 and members 65 with their axes arranged vertically.

It will be seen from the illustration of FIG. 5 that the outer probe 18 is provided with a vacuum in its chamber 53 at position A which is changed to a pressure at a point between positions A and B. The outer probe 18 is provided with air at positive pressures at positions B, C, and D and the pressure must be increased from position B to position D so that the gauging force exerted by the outer probe against surface 22 and represented by the arrow K is maintained substantially constant at all angular positions. The inner probe 18 is supplied with a vacuum in its associated chamber 53 at all positions A through D and the vacuum is increased as the inner probe moves from position A to position D so that the gauging force exerted by the inner probe 18 against the inside surface 30 is also maintained substantially constant at all positions and also represented by an arrow K It will also be appreciated that the absolute pressure regulator 74 associating with the inner probe 18 will be set to provide a pressure condition in its associated chamber 53 which is opposite from the pressure condition in the chamber 53 associated with the outside probe. For example, at position C a vacuum is provided in chamber 53 of the inner probe and a positive pressure is provided in chamber 53 of the outer probe. However, at each position A—D for each probe 18 the pressure condition, whether negative or positive, in its associated chamber is a function of the sine of the angle of inclination from horizontal.

Each probe 18 and its associated piston 52 is suitably supported for substantially frictionless telescoping movement, as by using an air bearing, for example. Thus, the pressure condition in chamber 53 is practically solely dependent on the above-mentioned angle of inclination from horizontal.

To assure that the attitude sensor 58 of the apparatus 50 has optimum sensitivity, the elongated rodlike member 65 is supported by a fluid bearing means for frictionless axial movement in a rectilinear path. In particular, it will be seen that the sensor 58 has a tubular member 83 which is carried within the housing 60 and member 83 has a cylindrical bore 84 therethrough which receives member 65. Member 83 may be made of a porous material which allows controlled airflow therethrough which is controlled by the character of the porous material.

The apparatus 50 has a conduit 85 which has a terminal discharge end in fluid flow communication with a passage 86 provided in the housing 60, and the passage 86 communicates with an annular chamber 90 defined by a pair of annular flanges 91 which extend radially outwardly from opposite ends of the member 83 and are sealed tightly against a cylindrical bore 92 comprising the inside surface of the housing 60. The upstream end of the conduit 85 is connected to an adjustable pressure regulator 93 which is supplied with air from a suitable pressure source, and the pressure regulator 93 is adjusted so that air is provided into the chamber 90 and through the porous material of cylindrical member 83 so that the air enters a cylindrical space 95 between the member 83 and the weighted member 65 to provide an air bearing therebetween and thereby enable substantially frictionless axial movement of the member 65 within its housing 60. The fluid or air introduced into housing 60 through passage 86 and through orifice 64 may be discharged from housing 60 using suitable passage means, not shown, and for reasons well known in the art.

The attitude sensor 58 has a pair of mechanical springs shown as compression springs 96 and 97 which may have identical spring rates, if desired. The spring 96 acts between an end wall 100 of the housing 60 and one end of the weighted member 65 while the spring 97 acts between the opposite end of the weighted member 65 and end portion 62 of the housing 60. The spring 97 is provided concentrically outwardly of the inner portion of the member 61 and in this example the planar surfaces 63 and 66 are arranged within the confines of the coils of the spring 97. The springs 96 and 97 are effective in resiliently holding the weighted rodlike member 65 and hence the planar surface 66 thereof in a desired position relative to the planar surface 63 while allowing relative movement of the planar surfaces 63 and 66 more closely toward each other as the forces of gravity tending to urge planar surface 66 toward the planar surface 63 increases with an increase in the angle of inclination of member 65 from a horizontal plane.

Springs 96 and 97 may be installed in position with a comparatively small initial compression thereon whereby they merely serve to center the weighted member 65 at the desired position within the housing 60. It has been found by tests that by putting a comparatively higher initial compression on the springs 96 and 97 there is a tendency to add damping to the operation of the apparatus 50 by reducing the tendency of the member 65 to oscillate as its associated gauge head 17 and probe 18 are moved to various angles of inclination. Adding a receptacle in line 70 having a comparatively larger volume for a given length than the volume of an equal length of line 70 also serves to damp any oscillation tendencies of member 65.

The apparatus 50 may have an adjustable restrictor 101 installed in the line 70 between the pressure regulator 72 and the pneumatic reversing relay 71. The adjustable restrictor 101 may be adjusted so that its adjustment cooperates with the adjustment provided on the pressure regulator 72 to provide any desired pressure in the sensing portion of the fluid conduit system. For example, the regulator 72 and restrictor 101 may be adjusted so that the operating pressure in the portion of the conduit 70 arranged between the member 71 and the attitude sensor 58 ranges between 12 and 18 p.s.i.g. with planar surfaces 63 and 66 being spaced their maximum and minimum amounts respectively.

The apparatus 50 has a variable restrictor 102 installed in a line 103 which has one end in fluid flow communication with the conduit 73 and its opposite end open to atmosphere. The restrictor 102 is effective in providing any desired constant amount of bleed to atmosphere to thereby reduce the effectiveness of and hence control the magnitude of the signal provided from the attitude sensor 58 through lines 70 and 73 to the absolute pressure regulator 74. A line 104 is also provided installed with one end communicating with the conduit 70 and its opposite end open to atmosphere. Another adjustable restrictor 105 is provided in the line 104 in series with a shutoff valve 106 arranged between the restrictor 105 and the point of connection of line 104 to the conduit 70. The adjustable restrictor 105 is also effective in providing a bleed from conduit 70 through line 104 to thereby effectively control the magnitude of the signal provided through the conduit 70.

The apparatus 50 also has a conduit 110 provided with one end in fluid flow communication with the conduit 75 and with a pressure-indicating device of indicator 111 operatively connected to its opposite end. A shutoff valve 112 is connected in the conduit 110 upstream of the pressure indicator 111. The valve 112 and pressure indicator 111 are utilized in the initial setup of the apparatus 50.

The open-jet back pressure system is initially set up with valve 106 closed so as to provide a pressure of 12 to 18 p.s.i.g., as previously indicated, with the planar surfaces 63 and 66 arranged so as not to exceed a distance of 0.006 inch. This 0.006-inch distance represents the linear range of a 0.078-inch-diameter open jet and the orifice 64 of this example has a 0.078-inch diameter.

With the gauge head 17 and its associated attitude sensor 58 in a horizontal position and valve 106 closed member 61 is threaded relative to member 62 to position planar surfaces 63 and 66 until a control signal of 15 p.s.i.g. is provided in the conduit 70. The inner gauge head 17 (with its probe 18 and attitude sensor 58) is alternated between horizontal position A and vertical position D, see FIG. 5, and the adjustable restrictor 102 is adjusted until a predetermined spread is read on the pressure indicator 111. Valve 106 is kept closed and valve 112 is kept open during this procedure. The spread, i.e., the difference in readings on the indicator 111, corresponds to the change in pressure or vacuum that in turn corresponds to the effective weight of the probe 18 and its integral piston 52. The absolute pressure regulator 74 is adjusted with the gauge head 17 and probe 18 arranged horizontally until the indicator 111 reads a desired pressure corresponding to a desired gauging force.

To retract the probe 18 the shutoff valve 106 is opened which decreases the magnitude of the signal in line 70 and increases the air signal to the absolute pressure regulator 74 by a fixed amount determined by the loss of bleed through line 104. The probe may thus be retracted at any angle of inclination without danger of retracting too fast because some pressure will still exist in line 70. Also, during gauging contact by probe 18 the shutoff valve 112 may be kept closed, if desired. Thus, it is seen that the setup and use of apparatus 50 is achieved with optimum simplicity and may be accomplished routinely by comparatively unskilled technicians.

As previously mentioned the orifice 64 of this example which provides airflow from planar surface 63 is a 0.078-inch-diameter open jet which is capable of providing accurate pressure signals with a total displacement of 0.006 inch between planar surfaces 63 and 66. The design of springs 96 and 97 together with the structural components of the attitude sensor 58 is such that as the associated gauge head 17 is tilted from a horizontal to a vertical position the total displacement between the planar surfaces 63 and 66 is 0.003 inch whereby the apparatus 50 provides optimum performance.

The measuring machine 10 of this exemplary embodiment of the invention has noncontact means such as electro-optical means associating with the probe 18 for indicating the position of such probe and hence of its outer tip 19. The elctro-optical means comprises a light-beam-splitting device 116 which cooperates with a reflective surface 115 on the piston 52 to provide a precise indication of the position of probe 18.

The device 116 has a reflective surface 117 and a 50-percent-reflective diagonal surface 120. A plurality of photoelectric cells 121 are fixed to the gauge head 17 in spaced relation and a suitable light source 122 is provided and arranged so that it emits light toward the beam-splitting device 116. The light from the light source 122 is acted upon by the device 116 so that rays thereof designated by a line 123 pass through the device 116 and are reflected from surfaces 115 and 120 toward the photoelectric cells 121. Other rays designated by a line 124 are reflected by surface 120 and by reflective surface 117 of device 116 so they emerge from device 116 in spaced relation from light rays 123 as indicated at 126 and produce an interference pattern.

The photoelectric cells 121 detect this pattern and provide electrical signals through lines 130 to a device 131. The photoelectric cells 121 and the device 131 cooperate to determine the position of surface 115 relative to device 116 and hence the position of the tip 19 as it is urged by apparatus 50 against the workpiece 23 with a constant force; and, the device 131 converts the input signals from the photocells in a known manner to output signals which correspond to dimensional measurements of the workpiece which are displayed on a display device 132 which is operatively connected to the device 131.

In this example of the invention an electro-optical means is provided in association with each gauging probe 18 of the measuring machine 10 for indicating the position of each probe 18; however, any suitable means may be provided to indicate the position of each probe 18 and thereby provide a dimensional measurement. It will also be appreciated that each gauge head 17 is provided with suitable means enabling it to be positioned relative to its supporting structure to accommodate workpieces of different sizes.

Thus, it is seen that the measuring apparatus 50 provided in association with each inner and outer gauge head 17, in effect, compensates for the mass or weight of the gauging probe 18 at all attitudes of the probe 18 relative to a reference plane such as a horizontal plane and provides a precise compensating signal to an absolute pressure regulator 74 which is utilized to control the pressure, whether it be a positive pressure and greater than ambient or a negative pressure and less than ambient, within the chamber 53 of an associated gauge head 17 to assure that the associated probe 18 is urged outwardly against the workpiece 23 with a known constant force at all angular positions of the probe 18.

While present exemplary embodiments of this invention, and methods of practicing the same, have been illustrated and described, it will be recognized that this invention may be otherwise variously embodied and practiced by those skilled in the art.

I claim:

1. In combination: a gauge head having a probe which is movable in a rectilinear path coinciding with an axis thereof, said probe having a fluid-actuated piston operatively associated therewith, and an apparatus for compensating for the weight of said probe to keep the force exerted by said probe against a workpiece substantially constant with said gauge head and said axis arranged at any desired angle of inclination from a reference plane, said apparatus controlling the pressure of a fluid acting against said piston as a function of the angle of inclination of said axis from said reference plane to thereby control said force exerted by said probe.

2. A combination as set forth in claim 1 in which said gauge head has a fluid chamber which has a longitudinal axis coinciding with said axis of said probe and said probe has said fluid-actuated piston comprising the rear portion thereof with said piston being supported for sliding movement in said chamber, said apparatus controlling the pressure of said fluid in said chamber and hence the pressure acting against said piston.

3. A combination as set forth in claim 1 in which said gauge head has a fluid chamber which has a longitudinal axis coinciding with said axis of said probe and said probe has said fluid-actuated piston comprising the rear portion thereof with said piston being supported for sliding movement in said chamber, said apparatus comprising an open-jet control apparatus which utilizes air as an operating medium and controls the pressure of air in said chamber and hence the pressure of air acting against said piston, and said apparatus having its principal control components fixed to said gauge head for simultaneous movement therewith.

4. A combination as set forth in claim 1 in which said reference plane comprises a horizontal plane and said apparatus is operatively connected to said gauge head and comprises, a first planar surface having an orifice provided therein for ejecting fluid outwardly therefrom in a direction substantially perpendicular to said first planar surface, a weighted movable member having a second planar surface which is arranged parallel to said first planar surface and is supported for limited rectilinear movement toward and away from said first planar surface along a second axis arranged parallel to the axis of said probe, and fluid conduit means having one end means connected to said orifice and its opposite end means associating with a fluid source supplying fluid to said piston, said second planar surface being urged more closely adjacent said first planar surface by gravity acting against said weighted member as said probe and weighted member are moved so that said parallel axes are simultaneously moved from positions parallel to said horizontal plane toward vertical positions to thereby provide a fluid pressure signal in said fluid conduit means which increases in direct proportion to the sine of said angle of inclination from said horizontal plane.

5. A combination as set forth in claim 4 and further comprising noncontact means associating with said probe for precisely determining its position during gauging contact of its outer tip against a workpiece to thereby provide precise dimensional measurements of said workpiece.

6. A combination as set forth in claim 5 in which said noncontact means comprises electro-optical means.

7. A combination as set forth in claim 4 in which said weighted member comprises an elongated rodlike member having an axis coinciding with said second axis and having said second planar surface arranged perpendicular to said second axis and defining an end surface of said rodlike member.

8. A combination as set forth in claim 4 in which said apparatus further comprises fluid-bearing means supporting said weighted member for frictionless movement.

9. A combination as set forth in claim 4 in which said weighted member comprises an elongated rodlike member and said apparatus further comprises fluid-bearing means supporting said rodlike member for frictionless movement and a pair of mechanical springs engaging opposite end portions of said rodlike member and resiliently holding said rodlike member and its second planar surface adjacent said first planar surface.

10. A combination as set forth in claim 4 in which said weighted member comprises an elongated rodlike member having an axis coinciding with said second axis and having said second planar surface arranged perpendicular to said second axis and defining an end surface of said rodlike member, and said apparatus further comprises, a supporting housing, a tubular member carried within said housing and having a bore which receives said rodlike member therethrough, means for providing air under regulated pressure between said tubular member and said rodlike member to provide an air bearing therebetween and support said rodlike member for frictionless axial sliding movement, and a pair of mechanical springs, each of said springs acting between an associated end portion of said rodlike member and an end of said housing and said springs resiliently holding said rodlike member and its second planar surface adjacent said first planar surface while allowing said second planar surface to move more closely toward said first planar surface with an increase in said angle of inclination.

11. In a gauge head having a fluid chamber therein and having a gauging probe provided with a piston defining the rear portion thereof, with said piston being arranged within said fluid chamber and being axially slidable in a rectilinear path coinciding with the longitudinal axis of said probe, an apparatus adapted to control the force exerted by said gauging probe against a workpiece by controlling the pressure of a fluid in said fluid chamber as a function of the sine of the angle of inclination of said longitudinal axis from a horizontal plane to thereby maintain the force exerted by said gauging probe against said workpiece substantially constant at all angles of inclination, said apparatus comprising, a support carried by said gauge head, a first planar surface carried by said support and having an orifice provided therein for ejecting fluid outwardly therefrom in a direction substantially perpendicular to said first planar surface, a weighted movable member having a second planar surface arranged parallel to said first planar surface and supported by said support for limited rectilinear movement toward and away from said first planar surface along a second axis arranged parallel to the axis of said probe, fluid supply means for supplying fluid of said fluid chamber, and fluid conduit means having one end means connected to said orifice and its opposite end means associating with said fluid supply means, said second planar surface being urged more closely adjacent said first planar surface by gravity acting against said weighted member as said probe and weighted member are moved so that said parallel axes are simultaneously moved from positions parallel to said horizontal plane toward vertical positions to thereby provide a fluid pressure signal in said fluid conduit means which increases in direct proportion to the sine of said angle of inclination from said horizontal plane, said signal operatively associating with said fluid supply means to provide a pressure in said fluid chamber corresponding to said signal.

12. An apparatus as set forth in claim 11 in which said fluid supply means comprises an absolute pressure regulator.

13. An apparatus as set forth in claim 11 in which said weighted member comprises an elongated rodlike member having an axis coinciding with said second axis and having said second planar surface arranged perpendicular to said second axis and defining an end surface of said rodlike member.

14 An apparatus as set forth in claim 11 in which said apparatus further comprises fluid bearing means supporting said weighted member for frictionless movement.

15. An apparatus as set forth in claim 11 in which said weighted member comprises an elongated rodlike member and said apparatus further comprises fluid bearing means supporting said rodlike member for frictionless movement and a pair of mechanical springs engaging opposite end portions of said rodlike member and resiliently holding said rodlike member and its second planar surface adjacent said first planar surface.

16. An apparatus as set forth in claim 11 in which said weighted member comprises an elongated rodlike member having an axis coinciding with said second axis and having said second planar surface arranged perpendicular to said second axis and defining an end surface of said rodlike member, said support comprises a supporting housing and said apparatus further comprises, a tubular member carried within said housing and having a cylindrical bore which receives said rodlike member therethrough, means for providing air under regulated pressure between said tubular member and said rodlike member to provide an air bearing therebetween and support said rodlike member for frictionless axial sliding movement, and a pair of compression springs, each of said springs acting between an associated end portion of said rodlike member and an end of said supporting housing and said springs resiliently holding said rodlike member and its second planar surface adjacent said first planar surface while allowing said second planar surface to move more closely toward said first planar surface with an increase in said angle of inclination.

17. An apparatus as set forth in claim 11 in which said fluid pressure signal comprises an air pressure signal and further comprising an adjustable restrictor in flow communication with said fluid conduit means for controlling the magnitude of said air pressure signal to said fluid supply means and thereby control the effectiveness of the air pressure signal.

18. An apparatus as set forth in claim 17 and further comprising means for supplying air under regulated pressure to said orifice and a pneumatic pressure control relay installed in said fluid conduit means and cooperating with said adjustable restrictor for controlling the magnitude of said air pressure signal.

19. In combination: a gauge head having a movable workpiece-contacting probe, said gauge head having workpiece contact force control means, and apparatus for keeping the force exerted by said probe against a workpiece substantially constant with said gauge head arranged at any desired orientation with respect to a reference plane, said apparatus being responsive to said orientation and operatively associated with said control means to thereby control the force exerted by said probe against a workpiece.

20. A method of controlling the force exerted by a gauging probe against a workpiece with said gauging probe having a piston defining the rear portion thereof, said method comprising the steps of, supporting said gauging probe on the tubular surface of a fluid chamber in an associated gauge head with said piston and probe being axially slidable along said tubular surface in a rectilinear path coinciding with the longitudinal axis of said gauging probe, and controlling the pressure of a fluid in said fluid chamber as a function of the angle of inclination of said axis from a reference horizontal plane to thereby maintain the force exerted by said gauging probe against said workpiece substantially constant at all angles of inclination of said axis from said reference plane.

21. A method as set forth in claim 20 in which said fluid comprises air and said controlling step comprises controlling the absolute pressure of said air in said fluid chamber using an absolute pressure regulator.

22. A method as set forth in claim 21 and comprising the further step of determining the position of said gauging probe relative to said gauge head with a noncontact position sensor to provide precise dimensional measurements of said workpiece.

23. A method as set forth in claim 21 in which said controlling step comprises controlling said absolute pressure regulator with an air back pressure system.